Oct. 4, 1932.  D. W. MORLEY ET AL  1,880,457
FREE WHEEL MECHANISM FOR AUTOMOBILE USE AND FOR LIKE PURPOSES
Filed Jan. 23, 1932
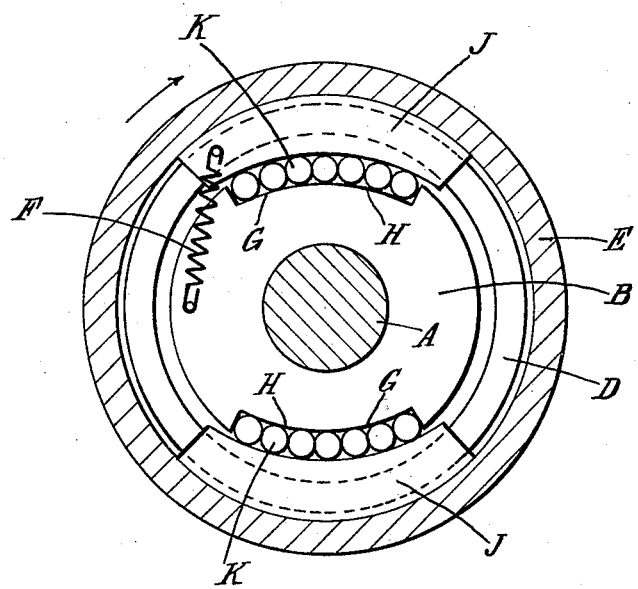

Patented Oct. 4, 1932

1,880,457

UNITED STATES PATENT OFFICE

DENYS WARWICK MORLEY AND FRANK CLARK WELLER, OF HONG KONG, CHINA

FREE-WHEEL MECHANISM FOR AUTOMOBILE USE AND FOR LIKE PURPOSES

Application filed January 23, 1932, Serial No. 588,282, and in Great Britain August 29, 1930.

This invention relates to an improved form of free wheel mechanism for automobile use and for like purposes, and has for its object to provide a mechanism which will free wheel in one or both directions when the two shafts interconnected by the mechanism are running at substantially uniform individual speeds of rotation, but which will take up drive on sharp acceleration or deceleration of the driving shaft.

According to the invention we provide a driving shaft and a driven shaft and we locate between them an inertia device preferably of wedge formation which on sudden acceleration or deceleration of the driving shaft lags behind owing to its inherent inertia and locks the two shafts together. If desired, the inertia device may be given a definite bias towards its accelerating lag position in order that the gradual take-up of the drive, as in the case particularly of automobiles, may be through the customary friction clutch, and not through the device itself.

In carrying out the invention according to one practical form the shaft which normally drives (i. e. in automobile use, the power shaft from the engine) is provided with a cam surface or surfaces. In conjunction with this cam surface or surfaces, is or are provided wedge members preferably inter-connected by means of a floating cage, and operative between the cam surfaces described and the annular driven member.

The action of the device is then as follows:—

On sudden acceleration of the driving shaft taking place, the wedge members "set back" or lag over the cam surfaces due to their own inherent inertia and that of the cage containing them, and engage with the rollers, thus locking the assembly.

Conversely, if the driving shaft is suddenly decelerated the wedge members will set forward and lock the assembly again in a manner similar to that previously described.

Where the mechanism according to the invention is employed for automobile drive, it is preferably located between the clutch and the back axle drive. It will be appreciated that in these circumstances there would be a sudden jar when the drive was taken up from rest unless the wedge members were in the accelerating lag position. For this reason we give the inertia device a definite bias towards this position as by means of springs or the like so that drive shall be taken up gradually in the usual manner at the clutch instead of by the device itself.

It will be appreciated from consideration of the device as used for automobile work, that if the foot is gradually eased off the accelerator the car will free wheel in known manner, but if the foot be taken off suddenly such as in an emergency to apply the brake or clutch the assembly will re-lock, thus obviating the feeling of insecurity which is normally engendered on taking over control of a car fitted with a free wheel device.

The single view of the accompanying drawing shows the invention diagrammatically.

Referring now to the drawing, the driving shaft A has formed in connection with it the cam member B. The cam B is formed at diametrically opposite points with symmetrical cam surfaces having portions G and H, said respective cam surfaces being located between opposing shoulders between which shoulders are disposed a set of anti-friction rollers K to be disposed between and in contact with the opposing faces of the respective cam surfaces and the respective inner faces of cooperating inertia wedge members J loosely carried by the floating cage D, said wedge members J being adapted to have radial movement with relation to said floating cage D, whereby said wedge members J may move into and out of driving contact with the outer annular member E, which is the driven member.

The operation of the device is as follows:—

The spring F tends to bias the particular wedge members J, and through the latter, the inertia cage D in an anti-clockwise direction, therefore, when the driving member A and cam B revolves in a clockwise direction, rotation is transmitted to the exterior ring E, because the wedge members J ride up their respective sets of rollers K in the direction of portion G of the cam faces and by said rollers K are forced radially outward into locking engagement with the opposed inner face of the driven member E. Thus positive drive is established from A to E. If now the ring E tends to overrun the driving member A, the wedge members J move back to central or neutral position and thus a free wheel action is obtained.

If, however, the member A is suddenly decelerated, the inertia of the wedge members J and D will act against the spring F and the wedge members J will ride upon the rollers K disposed upon the opposite portions H, of the respective symmetrical cam faces, thus allowing the member E to drive the member A.

In driving a car so fitted, therefore, it will be seen that gradual release of the accelerator pedal will produce a free wheel action while sudden release will relock the mechanism and allow the road wheels to drive the engine.

What we claim is:—

A free wheel mechanism for automobile use and for like purposes, comprising a driving member, a driven member, and cam and wedge means located between them and adapted to operate by inertia on both sides of a central position, said means including a cam having symmetrical cam surfaces and mounted on said driving member, a plurality of wedge members located between said driving member and said driven member, a floating cage adapted to position said wedge members with regard to each other, spring means connecting one of said wedge members with said cam to give a bias in one direction, and a plurality of roller members located between said cam surfaces and said wedge members.

In testimony whereof, we have signed our names to this specification at 2 Queens Road Central Hongkong this 11th day of December, 1931.

DENYS WARWICK MORLEY.
FRANK CLARK WELLER.